United States Patent [19]
Zander

[11] Patent Number: 5,796,464
[45] Date of Patent: Aug. 18, 1998

[54] CAMERA WITH SLIDE-OPEN CLOSURE FLEXED TO RELEASE FOR OPENING

[75] Inventor: Dennis Roland Zander, Penfield, N.Y.

[73] Assignee: Eastman Kodak Company, Rochester, N.Y.

[21] Appl. No.: 597,720

[22] Filed: Feb. 7, 1996

[51] Int. Cl.$^6$ ........................................... G03B 17/02
[52] U.S. Cl. ........................................... 354/288
[58] Field of Search ........................ 354/174, 275, 354/288; 292/80, 84, 86, DIG. 38

[56] References Cited

U.S. PATENT DOCUMENTS

| | | | |
|---|---|---|---|
| 313,857 | 3/1885 | Dunn | 292/80 |
| 316,115 | 4/1885 | Cassady | 292/86 |
| 318,781 | 5/1885 | Miller | 292/80 |
| 1,895,791 | 1/1933 | Garford | 220/3.8 |
| 2,941,691 | 6/1960 | Weinberg | 220/346 |
| 3,523,496 | 8/1970 | Nerwin | 354/288 |
| 3,585,913 | 6/1971 | Lange | 354/288 |
| 3,602,118 | 8/1971 | Oberheim | 354/288 |
| 4,469,421 | 9/1984 | Kamata | 354/288 |
| 4,890,130 | 12/1989 | Takei et al. | 354/288 |
| 4,937,606 | 6/1990 | Soumi et al. | 354/288 |
| 5,083,721 | 1/1992 | Okutsu et al. | 354/275 |
| 5,348,356 | 9/1994 | Moulton | 292/80 |

*Primary Examiner*—Safet Metjahic
*Assistant Examiner*—Eddie C. Lee
*Attorney, Agent, or Firm*—Roger A. Fields

[57] ABSTRACT

A photographic camera comprising a camera body, a chamber within the body, and a door for closing the chamber which is slidable open to uncover the chamber, is characterized in that the door is flexible away from the body, and mutually engaging means are located on the body and the door for preventing the door from being slid open, but which are disengaged to permit the door to be slid open when the door is flexed away from the body.

4 Claims, 4 Drawing Sheets

CAMERA WITH SLIDE-OPEN CLOSURE FLEXED TO RELEASE FOR OPENING

CROSS-REFERENCE TO RELATED APPLICATION

Reference is made to commonly assigned copending application Ser. No. 08/569,633 entitled APPARATUS AND METHOD FOR OPENING AND CLOSING A PHOTOGRAPHIC CAMERA and filed Dec. 8, 1995 in the names of William A. Bergstresser, Eric P. Hochreither, Paul Teremy and Dennis R. Zander.

The cross-referenced application is incorporated in this application.

FIELD OF THE INVENTION

The invention relates generally to the field of photography, and in particular to photographic cameras. More specifically, the invention relates to a camera with a slide-open closure that is flexed to be released for opening.

BACKGROUND OF THE INVENTION

It is well known for a photographic camera to comprise a camera body, a film or other chamber within the body, and a door for closing the chamber which is slidable open to uncover the chamber.

SUMMARY OF THE INVENTION

A photographic camera comprising a camera body, a chamber within the body, and a door for closing the chamber which is slidable open to uncover the chamber, is characterized in that:

the door is flexible away from the body; and mutually engaging means are located on the body and the door for preventing the door from being slid open, but which are disengaged to permit the door to be slid open when the door is flexed away from the body.

More specifically, the door includes integral cam follower means to be cammed to flex the door away from the body to disengage the mutually engaging means. The cam follower means is located inside a tool insertion hole in the door to be cammed when a camming tool is inserted into the hole and moved to slide the door open.

DETAILED DESCRIPTION OF THE INVENTION

Figure 1:
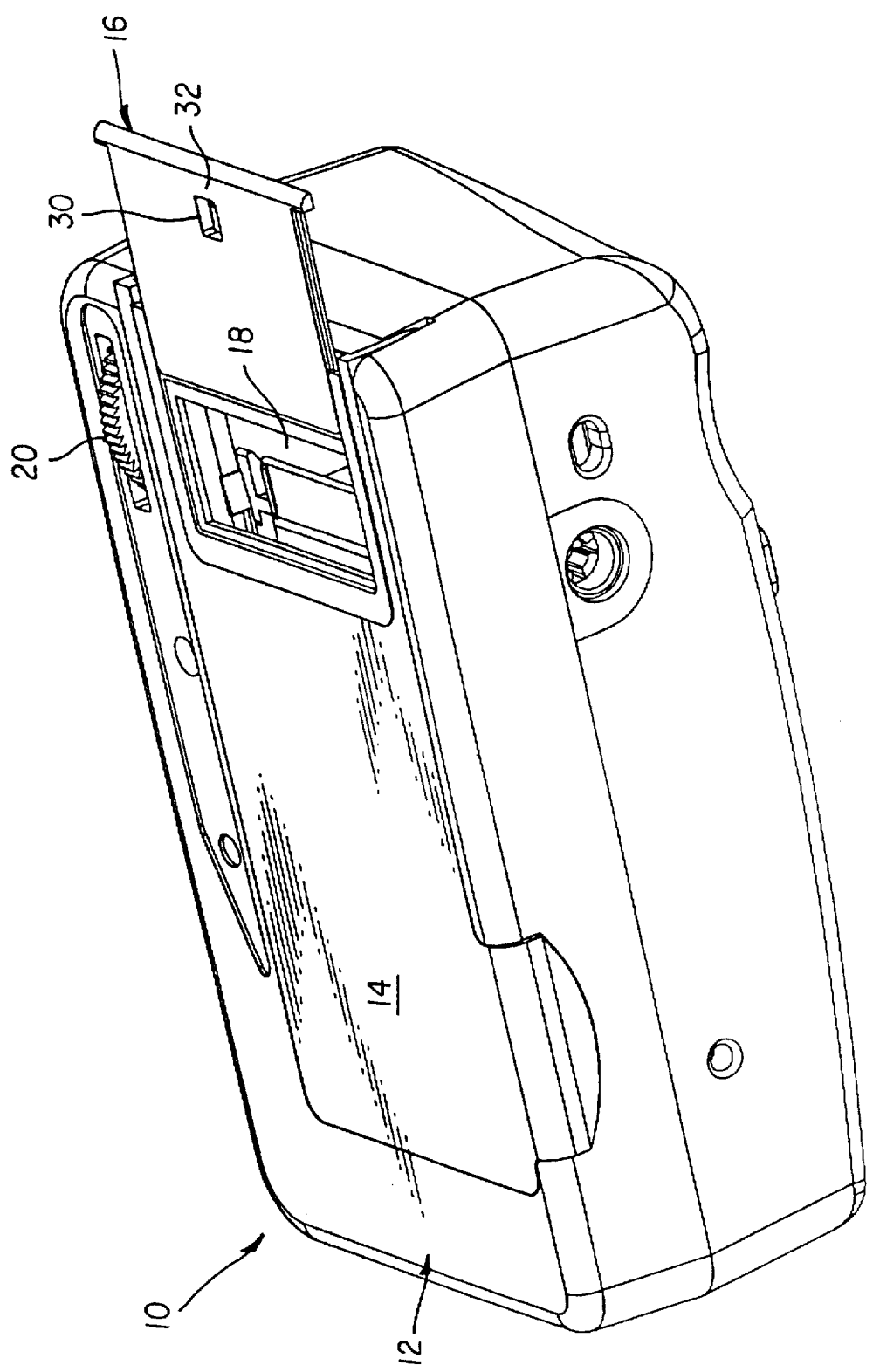
FIG. 1 is a rear perspective view of a photographic camera according to preferred embodiment of the invention, showing a rear sliding door that is slid open to uncover a film take-up chamber in the camera body.

The invention is disclosed as being embodied preferably in a photographic camera. Because the features of a photographic camera are generally well known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a photographic camera 10 comprising a camera body 12 having a sealed rear side 14 except for a rear sliding door 16. The door 16 is slid open (to the right in FIG. 1 and to the left in FIGS. 2–4) to uncover a film take-up chamber 18 within the body 12. A manual film wind thumbwheel 20 coaxially coupled to a film take-up drum (not shown) is rotatable to wind a filmstrip onto the drum a frame increment following each film exposure in the body 12. Other details of the photographic camera 10 may be found in the cross-referenced application.

Figure 2:
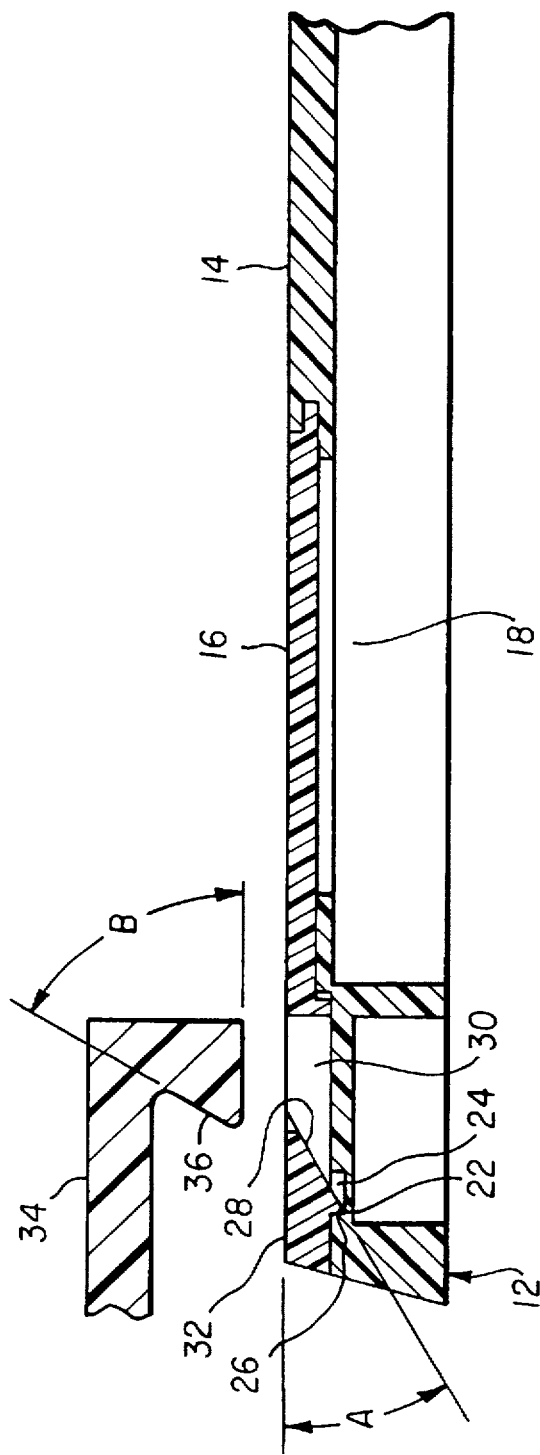
FIGS. 2, 3 and 4 are sectional views of the sliding door and a rear portion of the camera body, showing how an opening tool is used to release the door and slide it open.
Figure 3:
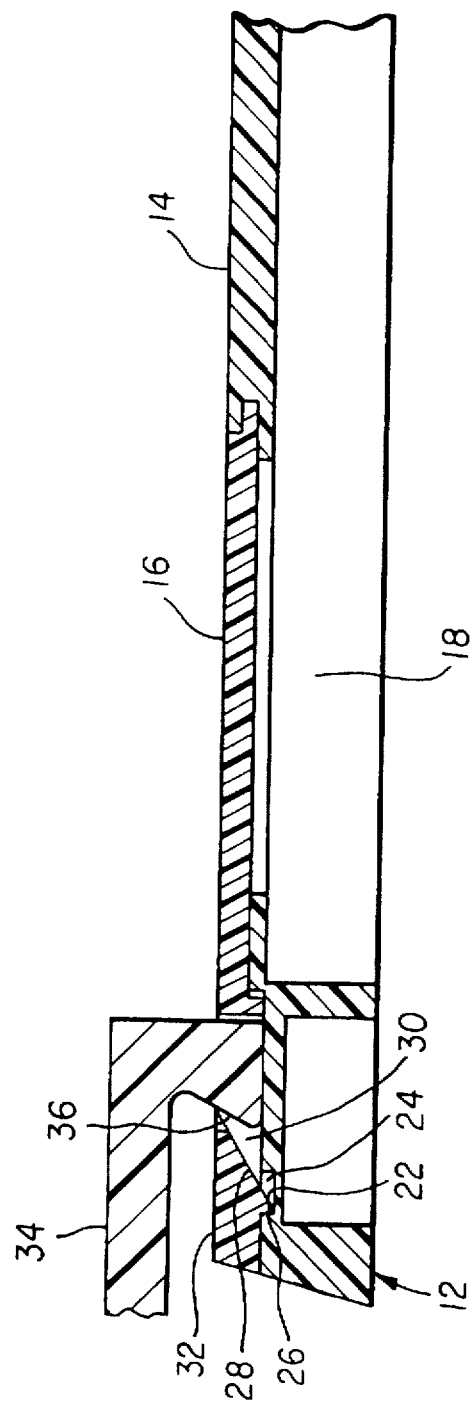

The door 16 has a catch protrusion or latch 22, shown in FIGS. 2 and 3, positioned within a catch hole 24 in the body 12 against a fixed stop edge 26 of the body to prevent the door from being slid open (to the left) to uncover the chamber 18. The stop edge 26 forms one side of the catch hole 24. The catch protrusion 22 is coplanar with an inclined cam follower surface 28 of the door 16 within a tool insertion hole 30 in the door. The inclined cam follower surface 28 has an acute angle A as shown in FIG. 2, and forms one side of the tool insertion hole 30. The door 16 particularly at a leading portion 32 is flexible to permit the door to be flexed slightly away from the body 12.

OPERATION

Figure 4:
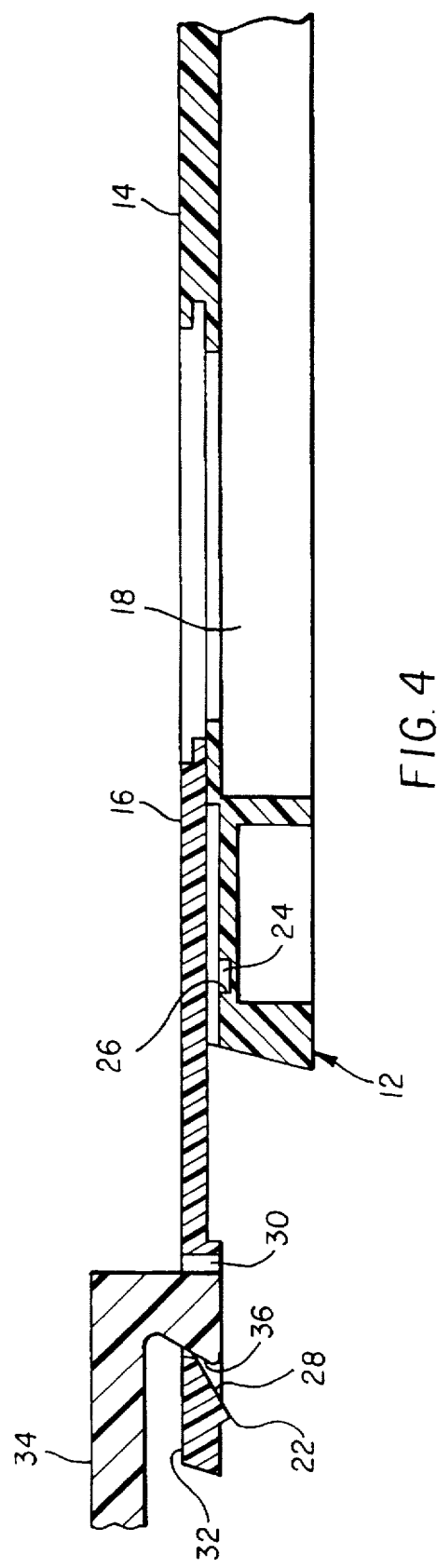

An opening tool 34 for sliding the door 16 open to uncover the chamber 18 is shown in FIGS. 2–4. The tool 34 includes an inclined camming surface 36 having an acute angle B which is greater than the acute angle A of the inclined cam follower surface 28 of the door 16.

To slide the door 16 open, first the tool 34 is inserted into the insertion hole 30 as far as it can go. See FIGS. 2 and 3. Then the tool 34 is moved to the left in FIG. 3 to bring its inclined camming surface 36 against the inclined cam follower surface 28 of the door 16. Continued movement of the tool 34 to the left in FIG. 3 forces its inclined camming surface 36 against the inclined cam follower surface 28 of the door 16 to flex the leading portion 32 of the door 16 away from the body 12. As a result, the catch protrusion 22 is removed from the catch hole 24 to separate from the stop edge 26. Then the tool is moved to the left in FIG. 4 to slide the door 16 open to uncover the chamber 18.

The invention has been described with reference to a preferred embodiment. However, it will be appreciated that variations and modifications can be effected by a person of ordinary skill in the art without departing from the scope of the invention. For example, the catch protrusion 22 can be on the body 12 and the stop edge 26 can be on the door 16. Moreover, in place of the catch protrusion 22 and the stop edge 26 other equivalent latching devices may be used.

PARTS LIST 10. photographic camera
12. camera body
14. sealed rear side
16. rear sliding door
18. film take-up chamber
20. manual film wind thumbwheel
22. catch protrusion
24. catch hole
26. fixed stop edge
28. inclined cam follower surface
30. tool insertion hole
32. leading portion
34. opening tool
36. inclined camming surface
A. acute angle
B. acute angle

I claim:

1. A photographic camera comprising a camera body, a chamber within said body, and a door for closing said chamber which is slidable open to uncover the chamber, is characterized in that:

said door is flexible away from said body;

mutually engaging means are located on said body and said door for preventing the door from being slid open, but which are disengaged to permit the door to be slid open when the door is flexed away from said body; and cam follower means is located on said door to be cammed to flex the door away from said body to disengage said mutually engaging means.

2. A photographic camera as recited in claim 1, wherein said door has a tool insertion hole, and said cam follower means is located inside said hole to be cammed when a camming tool is inserted into the hole and moved to slide the door open.

3. A photographic camera as recited in claim 1, wherein said mutually engaging means are a stop on said body and a protrusion on said door, and said cam follower means has an inclined cam follower surface coplanar with said protrusion to be cammed to flex said door away from said body to separate the protrusion from said stop.

4. A photographic camera as recited in claim 3, wherein said door has a tool insertion hole, and said inclined cam follower surface forms one side of said hole to be cammed to flex said door away from said body when a camming tool is inserted into the hole and moved to slide the door open.

* * * * *